July 14, 1964    J. F. J. PUHR-WESTERHEIDE    3,140,675

FUEL BURNER

Filed Jan. 25, 1961

INVENTOR.

JURGEN F. J. Puhr-Westerheide

BY *J. P. Moran*
ATTORNEY

United States Patent Office 3,140,675
Patented July 14, 1964

3,140,675
FUEL BURNER
Jurgen F. J. Puhr-Westerheide, Oberhausen, Rhineland, Germany, assignor to Babcock & Wilcox, Limited, London, England, a company of Great Britain
Filed Jan. 25, 1961, Ser. No. 84,797
Claims priority, application Germany Feb. 11, 1960
1 Claim. (Cl. 110—28)

This invention relates to a burner, and more particularly to a pulverized coal burner in which the fuel-air mixture fed axially of a burner conduit is set in rotary motion by a portion of the secondary air introduced tangentially to the axially flowing stream of fuel-air mixture and whereupon the whirling fuel-air mixture is then thoroughly intermingled with other secondary or peripheral air at the burner tip or orifice.

In order to achieve satisfactory efficiency in a burner operated, for example, with pulverized coal, all the particles of pulverized coal leaving the burner orifice should have enough oxygen mixed therewith to complete combustion, i.e. the fuel particles must be intimately mixed with the peripheral or secondary air.

This mixing of the air and fuel particles has been heretofore, achieved by utilizing swirl vanes in the fuel supply line to set the fuel-air mixture, i.e. the carrier air, into rotary motion. Oftentimes, the secondary or peripheral air is introduced into the fuel-air mixture through a separate series of swirl vanes to attain the intimate mixing with the fuel-air mixture.

In high output burners it has been observed that complete mixing is not always attained by the secondary or peripheral air with respect to the fuel-air mixture. As a result so called fuel stands are formed which result in a long flame. Such long flames are undesirable and uneconomical since the necessary air, that is, the necessary oxygen, can only be supplied to these fuel stands along the distant flame path.

It is an object of this invention to provide a burner arrangement that enhances good intermixing of the fuel particles with the air even at high output, i.e. when a large quantity of fuel-air mixture is supplied to the burner, so that complete combustion of the fuel supply is achieved.

This is attained by producing the rotary motion to the axially flowing fuel-air mixture by tangentially introducing thereinto secondary air immediately upstream of the burner orifice so that the whirling movement of the tangentially introduced secondary air is imparted to the air-fuel mixture within the burner conduit. In the illustrated embodiment a sleeve defining an outwardly flared burner orifice forms with the outer casing of the burner an annular air outlet circumscribing the burner orifice through which another portion of secondary or peripheral air emerges to intermingle with the whirling fuel-air mixture. When the burner is operated in combination with liquid or gaseous fuel, part of this fluid fuel may also be tangentially introduced into the axially flowing fuel-air mixture so that this tangentially introduced fluid flow imparts a rotary motion to the fuel-air stream.

In one embodiment of the burner construction of this invention, openings are provided immediately up-stream of the burner orifice in the burner conduit receiving the fuel-air mixture. Associated with each of the openings are guide vanes that project into the secondary air stream to effect rotation of the secondary air as the latter is introduced through the openings and into the fuel-air stream. According to this invention the secondary air stream that produces the rotary motion of the primary fuel-air mixture is arranged co-axially with respect to the fuel-air stream, and the sleeve defining the orifice through which the fuel-air mixture is discharged is rendered adjustable in an axial direction.

The construction of the burner in accordance with this invention results in that a rotary motion is imparted to the primary fuel-air stream by the partial flow of secondary air introduced tangentially of the primary fuel-air mixture stream. The initiation of the rotary motion of the primary fuel-air mixture, in accordance with this invention, minimizes wear since it obviates the need of any spiral vanes or deflectors against which the hard particles of pulverized coal were heretofore required to impinge in order to impart thereto a whirling motion and the impingement of which would result in considerable wear.

Also the burner orifice is constructed so that the fuel particles tending to move outwardly under the action of centrifugal acceleration, likewise, do not wear against the wall of the fuel air line. Thus, all wear is prevented at this part of the burner as well.

Other advantages and features of which will be readily apparent from the following specification when considered in view of the drawings in which.

Figure 1:
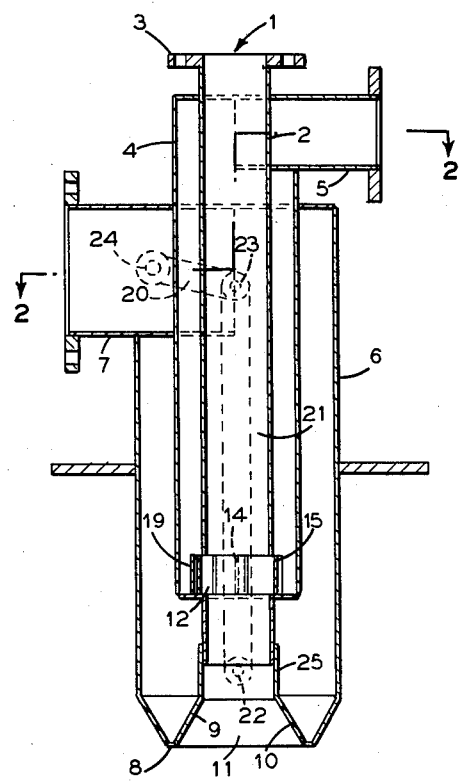
FIG. 1 is a longitudinal sectional view taken through the burner.

In FIG. 1 the primary fuel-air mixture line is denoted by 1 and comprises a conduit or pipe 2 which is provided at one end with a flange 3 by which it is connected to a fuel-air feed supply line (not shown). The other end of the conduit 2 terminates in the burner discharge nozzle 11. As shown the discharge nozzle 11 is defined by a sleeve 25 which is slidably mounted on the burner conduit 2, and the sleeve terminates in an outwardly flared portion to define a frusto-conical orifice 11. A pipe or casing 4, which is provided with an inlet 5, serves to define an annular passageway for the secondary or air utilized to set the axially flowing primary fuel-air mixture in rotary motion. This is attained by tangentially introducing the secondary air into the fuel air stream at a point immediately ahead or up-stream of the burner orifice 11.

As shown the casing 4 is arranged concentrically with respect to conduit 2. Conduit 2 and casing 4 are further surrounded by an outer pipe or tube 6 which serves to supply the outer periphery or other portion of secondary which may also be referred to as tertiary air and which is introduced thereinto through inlet 7.

As shown the enlarged outwardly flared frusto-conical orifice 11 of the sleeve 25, by axial adjustment back and forth, is arranged with respect to the outer tube 6 to adjustably regulate annular opening 8 through which the secondary or tertiary air is permitted to flow.

Figure 2:
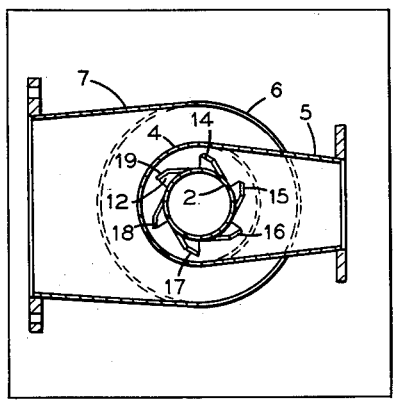
FIG. 2 is a sectional view taken along line 2—2 of FIG. 1.

The burner conduit 2 adjacent to discharge orifice 11 is provided with a plurality of circumferentially spaced openings 12 through which a portion of the secondary air required to set the fuel-air mixture streaming through conduit 2 with rotary motion, is permitted to pass therethrough. As more clearly shown in FIG. 2, each opening 12 is provided with a guide vane 14, 15, 16, 17, 18 and 19, arranged to project outwardly into the secondary air stream flowing through pipe 4. Thus, the axially moving secondary air in pipe 4 is deflected by vanes 14 through 19 and they direct this secondary air tangentially into pipe 2. Thus the tangential introduction of this secondary air into the fuel-air streams imparts a rotation which is transmitted to the axially flowing fuel-air stream.

Other secondary air or peripheral air to support combustion is introduced into tube 6 through inlet 7, and is discharged therefrom through an annular orifice 8 which circumscribe burner orifice 11.

Means for adjusting the band width of orifice 8 are provided. This is attained by moving the orifice sleeve axially of conduit 2. To facilitate this adjustment lever arms 20, 21 suitably hinged at point 22, 23, 24 are provided. The arrangement is such that the sleeve 25 may be axially adjusted with respect to the outer tube or pipe 6 by the linkage connections shown and to which a suitable handle (not shown) is connected outside the burner.

The mode of operation of the burner as herein described is evident in the drawings. The primary fuel-air flows in an axial direction toward conduit 2 and is discharged therefrom through orifice 11. This stream of fuel-air mixture is set into rotary motion by the tangential introduction of secondary air supplied through openings 12, which due to the direction of the guide vanes 14 through 19 causes the secondary air entering conduit 2 to have a swirling or whirling motion and which motion is imparted to the axially flowing fuel-air stream. Thus, the centrifugal forces created tend to throw the individual fuel particles outwardly so that they intermingle with the secondary or peripheral air emerging from the annular orifice 8. This co-action achieves an intimate mixing of the fuel particles with the secondary or peripheral air. As there are thus fewer fuel particles at the center portion of the discharging fuel stream, as a result of the whirling motion imparted thereto, the air supplied at 1 suffices for completing the combustion of this centrally disposed particles, whereas the larger and heavier particles are intimately mixed with more of the secondary air.

While this invention is primarily described with reference to pulverized coal, it will be understood that the concept disclosed is equally applicable to a burner operating with either a gaseous or a liquid fuel.

While the instant invention has been disclosed with reference to a particular embodiment thereof, it is to be appreciated that the invention is not to be taken as limited to or of the details thereof as modifications and variations thereof may be made without departing from the spirit or scope of the invention.

What is claimed is:

A fuel burner comprising an unobstructed fuel conduit having a fuel inlet at one end and an axially adjustable outwardly flaring fuel discharge nozzle at its opposite end and adapted to conduct granular fuel carried in a stream of air from its inlet to a position adjacent its discharge end in a generally straight path of travel therein parallel to the axis of the conduit, means for introducing a stream of combustion air into said conduit, while imparting a whirling motion to said combustion air to cause a substantial portion of the axially moving fuel stream to assume a whirling motion throughout the remainder of its path of travel through said conduit, said last named means including vanes disposed outside said conduit out of contact with the fuel flow through said conduit and extending along only a portion of the length of said conduit at a position adjacent its discharge end, means for discharging an annular stream of combustion air into the fuel stream as it discharges from said nozzle including casing cooperating with said nozzle to form an orifice, and means for adjusting said nozzle axially of said conduit to vary the size of said orifice.

References Cited in the file of this patent

UNITED STATES PATENTS

| | | |
|---|---|---|
| 1,600,724 | Fitch | Sept. 21, 1926 |
| 2,560,074 | Bloomer | July 10, 1951 |
| 2,560,076 | Bloomer | July 10, 1951 |